United States Patent
Ezumi et al.

(10) Patent No.: US 7,051,916 B2
(45) Date of Patent: May 30, 2006

(54) FRICTION STIR WELDING METHOD

(75) Inventors: Masakuni Ezumi, Kudamatsu (JP); Kazushige Fukuyori, Kudamatsu (JP); Akihiro Satou, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 554 days.

(21) Appl. No.: 10/218,573

(22) Filed: Aug. 15, 2002

(65) Prior Publication Data

US 2002/0190102 A1 Dec. 19, 2002

Related U.S. Application Data

(63) Continuation of application No. 09/791,830, filed on Feb. 26, 2001, now abandoned.

(30) Foreign Application Priority Data

Oct. 27, 2000 (JP) .................... 2000-328080

(51) Int. Cl.
*B23K 20/12* (2006.01)
*B23K 31/02* (2006.01)

(52) U.S. Cl. .................. 228/112.1; 228/2.1
(58) Field of Classification Search ............ 228/2.1, 228/112.1; 156/73.5
See application file for complete search history.

(56) References Cited

U.S. PATENT DOCUMENTS

| | | | |
|---|---|---|---|
| 5,237,835 A | 8/1993 | Brochier | 62/336 |
| 5,460,317 A | 10/1995 | Thomas et al. | 228/112.1 |
| 5,794,835 A | 8/1998 | Colligan et al. | 228/13 |
| 6,029,879 A | 2/2000 | Cocks | 228/106 |
| 6,050,474 A * | 4/2000 | Aota et al. | 228/112.1 |
| 6,051,325 A | 4/2000 | Talwar et al. | |
| 6,193,137 B1 * | 2/2001 | Ezumi et al. | 228/112.1 |

(Continued)

FOREIGN PATENT DOCUMENTS

| | | |
|---|---|---|
| EP | 0 893 190 | 1/1999 |
| EP | 0893190 A2 * | 1/1999 |
| EP | 0985483 A2 * | 3/2000 |
| JP | 11-90656 | 4/1999 |
| JP | 11-267859 | 10/1999 |
| JP | 11-291067 | 10/1999 |
| JP | 11-320130 | 11/1999 |
| JP | 2000-52065 | 2/2000 |
| JP | 2000-61662 | 2/2000 |
| JP | 2000-233286 | 8/2000 |
| JP | 02001269779 A * | 10/2001 |
| JP | 02002153982 A * | 5/2002 |

OTHER PUBLICATIONS

Bendzsak, et al. "An Experimentally Validated 3D Model for Friction Stir Welding," Proceedings of the $2^{nd}$ International Friction Stir Welding Symposium, Gothenburg, Sweden Jun. 26–28, 2000.

European Search Report dated Oct. 31, 2003 for EP 01 30 1573.

*Primary Examiner*—Colleen P Cooke
(74) *Attorney, Agent, or Firm*—Antonelli, Terry, Stout & Kraus, LLP

(57) ABSTRACT

The end of a hollow member 10 is abutted against the end of a hollow member 20. The end of a face plate 21 is supported on a protrusion 15. A small-diameter portion 52 of a rotary tool 50 is inserted into the abutted area, and the tool 50 is moved along the abutted region while being rotated in a clockwise direction as observed from the large-diameter potion 51. Thus, the pressure of mobilized metal is greater on the right side of the axial center of the rotary tool. The thickness of the member from the tip of the inserted small-diameter portion 51 to the hollow areas 10b and 10a is thicker at the right side where the pressure is higher, thus preventing metal from flowing out into the hollow region 10a.

12 Claims, 4 Drawing Sheets

10, 20: hollow member,   10a, 10b: hollow portion,
11, 21: face plate,      50: rotary tool,
14: connecting plate,    51: large-diameter portion
15: protrusion,          52: small-diameter portion

U.S. PATENT DOCUMENTS

| | | | |
|---|---|---|---|
| 6,230,957 B1 | 5/2001 | Arbegast et al. | 148/516 |
| 6,237,829 B1 | 5/2001 | Aota et al. | 228/112.1 |
| 6,250,037 B1 * | 6/2001 | Ezumi et al. | 52/592.1 |
| 6,273,323 B1 | 8/2001 | Ezumi et al. | 228/112.1 |
| 6,299,050 B1 | 10/2001 | Okamura et al. | 156/73.5 |
| 6,315,187 B1 | 11/2001 | Satou et al. | 228/112.1 |
| 6,321,975 B1 | 11/2001 | Kawasaki et al. | 228/112.1 |
| 6,325,273 B1 | 12/2001 | Boon et al. | 228/112.1 |
| 6,494,011 B1 * | 12/2002 | Ezumi et al. | 52/592.1 |
| 2001/0007717 A1 * | 7/2001 | Ezumi et al. | 428/609 |
| 2002/0060238 A1 * | 5/2002 | Ezumi et al. | 228/112.1 |
| 2002/0081149 A1 * | 6/2002 | Ezumi et al. | 403/270 |
| 2002/0153130 A1 * | 10/2002 | Okamoto et al. | 165/170 |
| 2003/0005852 A1 * | 1/2003 | Okamura et al. | 105/396 |

* cited by examiner 10, 20: hollow member,  10a, 10b: hollow portion,
11, 21: face plate,     50: rotary tool,
14: connecting plate,   51: large-diameter portion
15: protrusion,         52: small-diameter portion

FRICTION STIR WELDING METHOD

This application is a Continuation application of Ser. No. 09/791,830 filed Feb. 26, 2001 now abandoned, the contents of which are incorporated herein by reference in their entirety.

FIELD OF THE INVENTION

The present invention relates to a friction stir welding method, and is especially applicable to welding of hollow members.

DESCRIPTION OF THE RELATED ART

Friction stir welding is a method of welding members in which a round shaft (called a rotary tool) is inserted while being rotated into a joint between the members, and the tool is then moved along the joint line, thereby heating, mobilizing and plasticising the material in the joint portion in order to perform solid-phase welding of the members. The rotary tool comprises a large-diameter portion and a small-diameter portion. The small-diameter portion is to be inserted into the joint between the members to be bonded to a level where the end surface of the large-diameter portion contacts the members. The small-diameter portion is equipped with a screw thread.

Moreover, a raised portion is formed in the area where the rotary tool is to be inserted between the two members to be bonded, and the metal material forming the raised portion is mobilized to fill the gap between the two members. The large-diameter portion of the rotary tool is arranged to fit within the bounds of the raised portion.

Since the rotary tool must be inserted into the metal of the joint portion, a great force is applied to the joint portion. Therefore, when bonding hollow members, the portion of a connecting plate or rib connecting the two face plates of a hollow member is positioned at the friction-stir-welding position where the member is welded to another hollow member. The friction stir welding is carried out while the connecting plate or rib receives the force applied to the joint, and therefore, deformation of the hollow members is prevented.

These features are disclosed in Japanese Patent Laid-Open Publication No. 11-90655 (U.S. Pat. No. 6,050,474).

SUMMARY OF THE INVENTION

Friction stir welding is carried out by inserting a rotary tool into the joint between the members to be welded, thereby plasticising and mobilizing the metal material thereof. If the thickness of the material from the tip portion of the small-diameter portion of the inserted rotary tool to the back surface of the welded member (opposite to the large-diameter portion) is small, the mobilized metal may flow out to the back surface thereof. Even if the material does not flow out, the member will be expanded outwardly. Such a phenomenon is also included in the meaning of the term "flow-out" used hereinafter in this specification. Because of this flow-out, the thickness of the protrusion compensating for the flow-out metal material must be increased. The flow-out also causes holes to be generated in the joint portion. In an attempt to prevent such flow-out, the thickness of the member is increased so that the distance from the tip of the small-diameter portion to the back surface of the member is increased. However, this increases both the weight of the member and the manufacturing cost thereof.

An object of the present invention is to provide a friction stir welding method which makes it possible to produce a lightweight bond having good characteristics.

Based on various studies related to friction stir welding, it now has been discovered that the pressure of the metal mobilized by the rotation of the rotary tool is not even within the range of influence of the rotary tool relative to the axial direction, but the pressure is different according to the position. It is considered that the position receiving higher pressure is determined by the direction of rotation of the rotary tool and the direction of movement of the tool.

The friction stir welding method according to the present invention is characterized by positioning the portion of the member having greater thickness, from the tip of the small-diameter portion to the back surface of the member, where the mobilized metal has the greatest pressure.

DETAILED DESCRIPTION OF PREFERRED EMBODIMENTS

Figure 1:
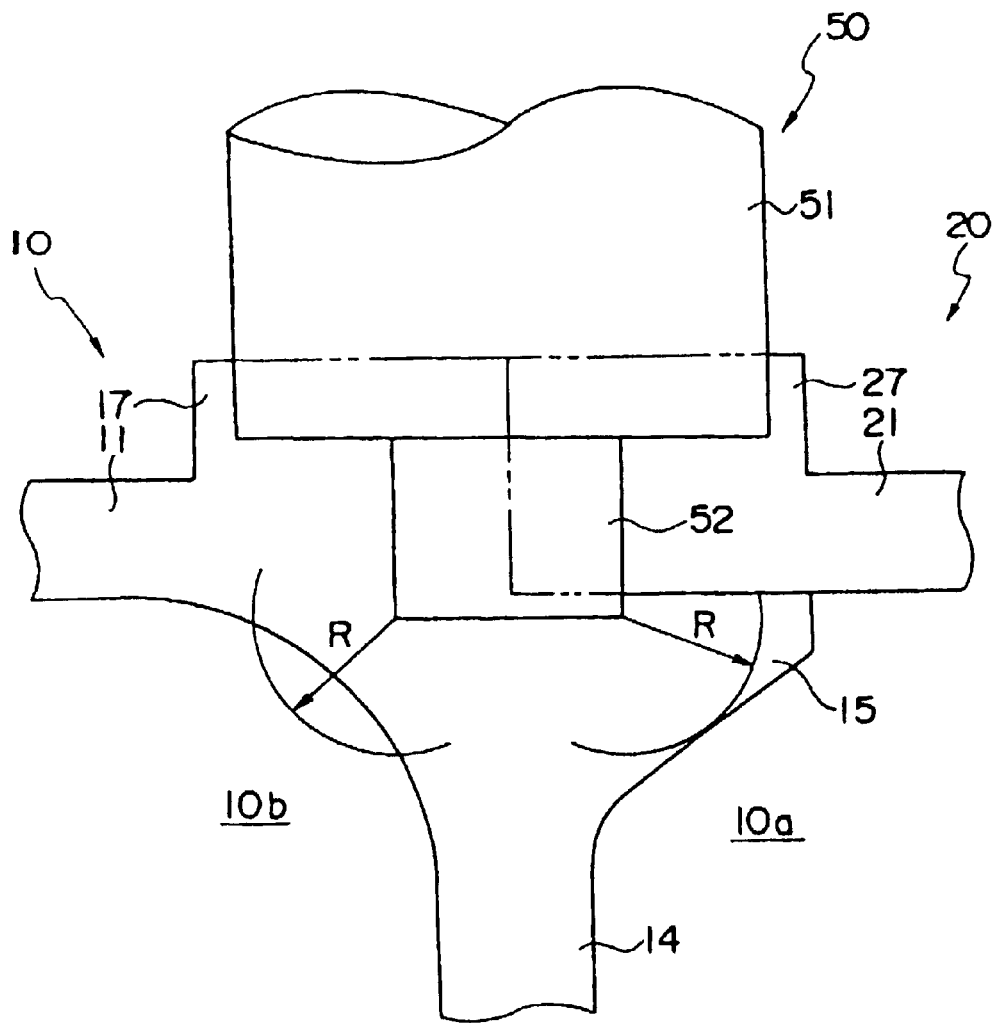
FIG. 1 is a vertical cross-sectional view showing the joint portion according to one embodiment of the present invention.

One embodiment of the present invention will now be explained with reference to FIGS. 1 through 4. Referring first to FIG. 4, a body 500 of a railroad car comprises a side structure 501 constituting the side surfaces, a roof structure 502 constituting the roof, an underframe 503 constituting the floor, and an end structure 504 constituting the end portions of the car. The side structure 501, the roof structure 502 and the underframe 504 are each formed by joining and welding plural extruded members 10, 20. The longitudinal direction (the extruded direction) of the extruded members 10, 20 is aligned with the longitudinal direction of the car body 500. The extruded members 10, 20 are hollow members made of aluminum alloy.

The structure of the hollow members 10, 20 constituting the side structure 501 will now be explained with reference to FIG. 3. The hollow members constituting the other areas are similarly formed.

The hollow member 10 (20) comprises two substantially parallel face plates 11 (21), 12 (22), and a plural number of connecting plates or ribs 13 (23) connecting the two face plates. The connecting plates 13 (23) are each angled relative to the face plates 11 (21) and 12 (22). In other words, the face plates 11 (21), 12 (22) and the connecting plates 13 (23) constitute a truss.

A connecting plate 14 (24) formed at the end portion of the hollow member 10 (20) in the width direction is orthogonal to the face plates 11, 12 (21, 22). The outer surface of the joint between the connecting plate 14 and the face plate 11 (12) has a raised portion for receiving the face plate 21 (22) of the hollow member 20. The end portion of the hollow member 10 is abutted against the end portion of the face plates 21, 22 of the hollow member 20. The ends of the face plates 11, 12 are each provided with a protrusion 15 for supporting the face plate 21 or 22. The protrusion 15 is protruded from the connecting plate 14. The protrusion 15 forms part of the recessed portion.

The end of the face plates 11, 12 (21, 22) are each provided with a raised portion 17 (27) extending outward from the outer surfaces of the hollow members 10, 20 (protrude outward in the direction of the thickness of the member). The end surface of the face plates 11, 12 (21, 22) and the raised portions 17 (27) are formed along the direction of thickness of the hollow member 10 (20). The end surfaces of the raised portions 17 (in other words, the raised portions which extend from the face plates 11, 12) are positioned near the center of the thickness of the connecting plate 14. The end surfaces of the raised portions 17 of the hollow member 10 are abutted against the end surfaces of the raised portions 27 of the hollow member 20.

The face plate 11 (12) and the face plate 21 (22) are positioned in the same plane, and the protruded margins of the raised portions 17 and 27 are equal. The width of the two raised portions 17, 27 are equal. The total width of the two raised portions is greater than the diameter of the large-diameter portion 51 of the rotary tool 50. The metal forming the raised portions 17, 27 is used as the source material for filling the gap of the abutted portions of the two members 10, 20.

To facilitate welding, the two hollow members 10, 20 are fixed on a base 100. Reference number 101 refers to a groove in the base 100 into which the raised portions 17, 27 formed to the lower surface are inserted.

The rotary tool 50 comprises a large-diameter portion 51 and a small-diameter portion 52 mounted on the end of the large-diameter portion 51. The small-diameter portion 52 is equipped with a screw thread. To perform welding, the rotary tool 50 is inserted into the joint between the abutted portions. The bottom area of the large-diameter portion 51 enters slightly into the raised portions 17, 27. The small-diameter portion 52 is inserted into the abutted portions between the face plates 11 and 21 so that the lower end of the small-diameter portion 52 is somewhat inserted to the protrusion 15. While rotating the rotary tool 50, the tool is moved along the joint line of the abutted portions.

Figure 2:
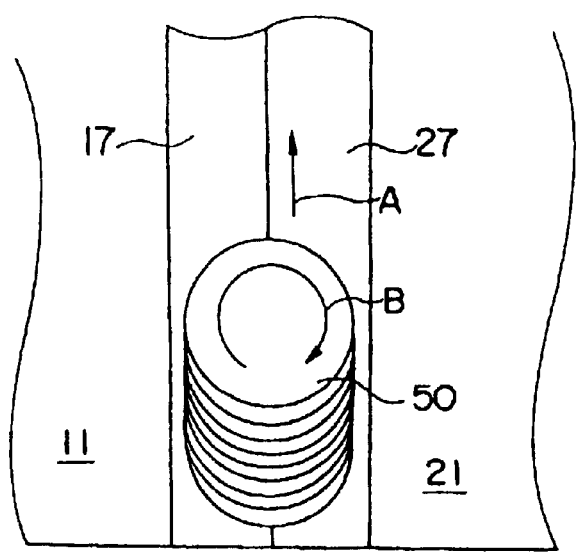
FIG. 2 is a top plan view of FIG. 1.

After inserting the rotary tool 50 into the area to be welded, the rotary tool 50 is moved from the closer side of the drawing of FIG. 1 to the farther side thereof. In FIG. 2, which is a plan view of FIG. 1, arrow A shows the direction of movement of the rotary tool 50, and arrow B shows the direction of rotation of the rotary tool 50. The screw thread of the small-diameter portion 52 is a left-hand screw. When observing the small-diameter portion 52 from the large-diameter portion 51, the rotational direction of the rotary tool 50 is clockwise. When looking forward from the rotary tool 50 in the direction of movement, the protrusion 15 extends to the right from the center axis of the rotary tool 50, as shown in FIG. 1.

Figure 3:
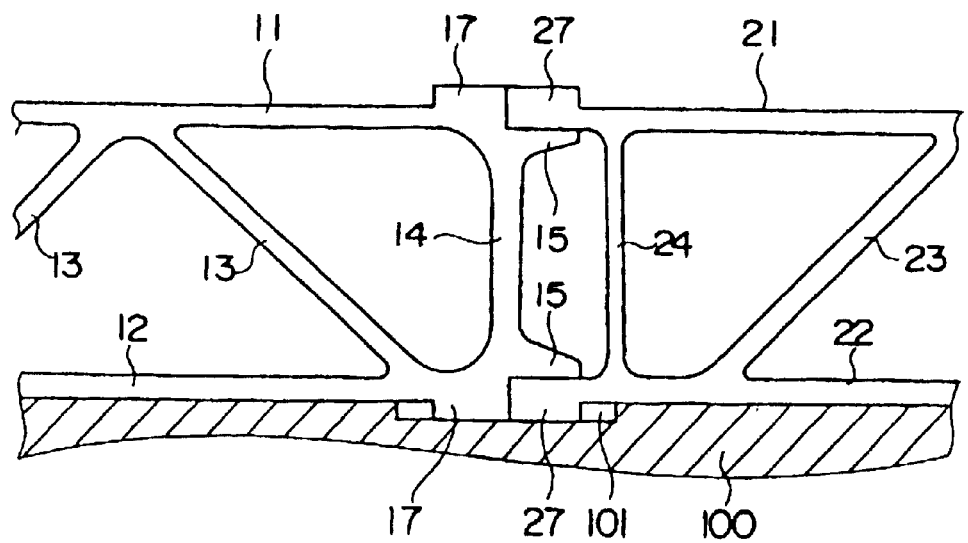
FIG. 3 is a vertical cross-sectional view showing one pair of hollow members according to one embodiment of the present invention.
Figure 4:
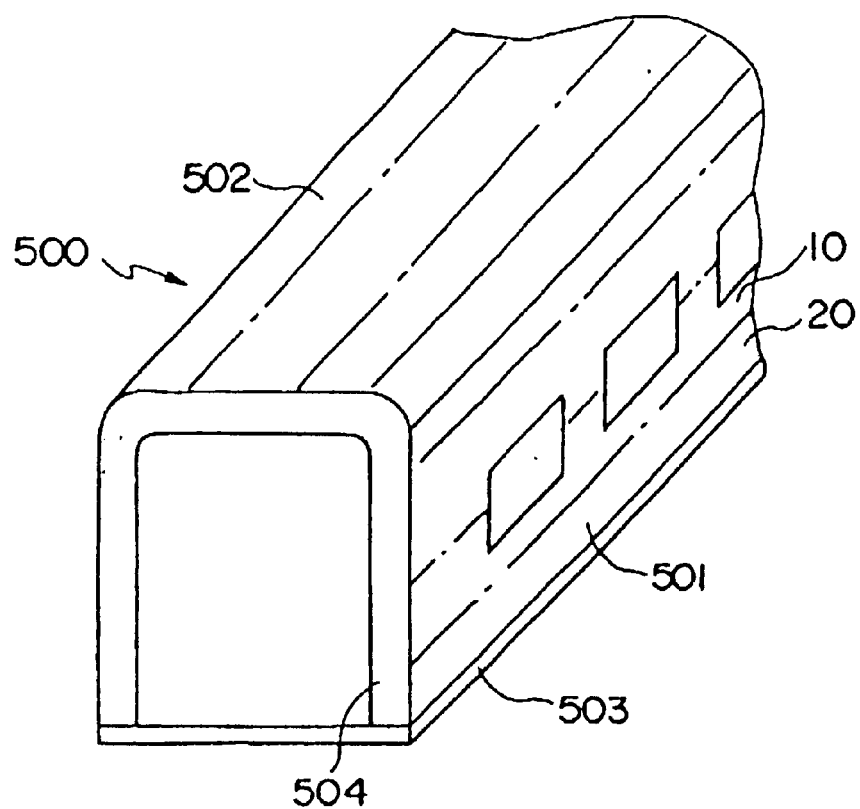
FIG. 4 is a perspective view showing the body of the railroad car.

After the friction stir welding of the upper surface shown in FIG. 3 is finished, the hollow members 10, 20 are reversed, and friction stir welding is similarly performed on the other side.

The pressure provided on the metal material of the joint portion mobilized by the rotary tool 50 is greater on the right side of the axial center of the rotary tool 50 than on the left side thereof, as seen in the direction of movement of the rotary tool 50. The clockwise rotation of the rotary tool 50 is considered to cause this phenomenon, the rotation pushing the material existing in front of the rotary tool 50 that has not yet been welded toward the right side of the tool.

In FIG. 1, a hollow area 10b, 10a exists on the left and right sides of the connecting plate 14. The distance from the tip of the small-diameter portion 52 inserted in to the joint portion to the left and right hollow areas 10b, 10a is set so that the distance from the tip to the protrusion 15 existing on the right side is greater than the distance on the left side. Since the protrusion 15 must support the face plate 21, the thickness of the protrusion is relatively thick. Therefore, the thickness of the area of the member receiving higher pressure is designed to be thicker. The mobilized metal will not flow out into the hollow area 10a because of this thickness of the protrusion 15, and therefore, no hole will be generated within the joint portion.

On the other hand, the pressure provided on the left side of the rotary tool 50 is relatively low compared to that on the right side thereof. The reason for this is considered to be because no unbonded metal exists behind the rotary tool 50.

Since the left side of the axial center of the rotary tool receives a small inner pressure, the thickness of the member measured from the tip of the small-diameter portion 52 to the hollow portion 10b on the left side of the connecting plate 13 can be reduced. This makes it possible to lighten the weight of the hollow member 10.

The "thickness of the member beginning from the tip of the inserted small-diameter portion 52 to the hollow portions 10b or 10a" will now be explained with reference to FIG. 1. The thickness of the metal needed in order to prevent the flow-out of metal at the side receiving higher pressure is set as R. Thickness R is necessary on the right side of the axial center of the small-diameter portion 52 measured from the tip of the small-diameter portion 52. In other words, the member on the right of the small-diameter portion 52 must have a thickness of radius R centered at the right-end corner of the small-diameter portion 52. The term thickness of the member beginning from the tip of the inserted small-diameter portion 52 to the hollow portion 10b41 refers to the thickness in the horizontal direction as well. The thickness of the member to the left of the axial center of the small-diameter portion 52 is smaller than thickness R.

We will now consider a comparison example, where the direction of the screw thread and the rotating direction of the rotary tool 50 is the same as the above-mentioned embodiment, but the position of the hollow members 10 and 20 are opposite, or in other words, in which the protrusion 15 extends toward the left side of the rotary tool 50. In this case, the thinner member is positioned on the right side of the rotary tool 50 where the pressure is higher, so that the mobilized metal material flows out into the hollow space. Therefore, a hole may be generated within the joint portion.

Moreover, when the stacked area of the protrusion 15 and the face plate 21 is placed on the left side of the small-diameter portion 52, the stacked surface near the joint portion may be knuckled toward the large-diameter portion 51 of the rotary tool 50, generating a notch. However, if the stacked area is positioned on the right side thereof, the stacked area exists where the pressure is high, and therefore the possibility of generating a notch is reduced.

In other words, the area having a greater thickness measured from the tip of the small-diameter portion 52 to the surface of the member opposite the large-diameter portion 51 should be placed where the pressure is higher. The high-pressure region exists on the right side of the rotary tool 50 when observing the tool from behind the direction of movement, if the direction of rotation of the rotary tool 50 is a clockwise rotation when observing the tool from the large-diameter portion 41.

If the screw thread of the small-diameter portion 52 is a right-hand screw, and if the direction of rotation of the rotary tool 50 is counterclockwise, the hollow members 10 and 20 should be oppositely assembled, so that the protrusion 15 is positioned to the left of the axial center of the rotary tool 50.

Figure 5:
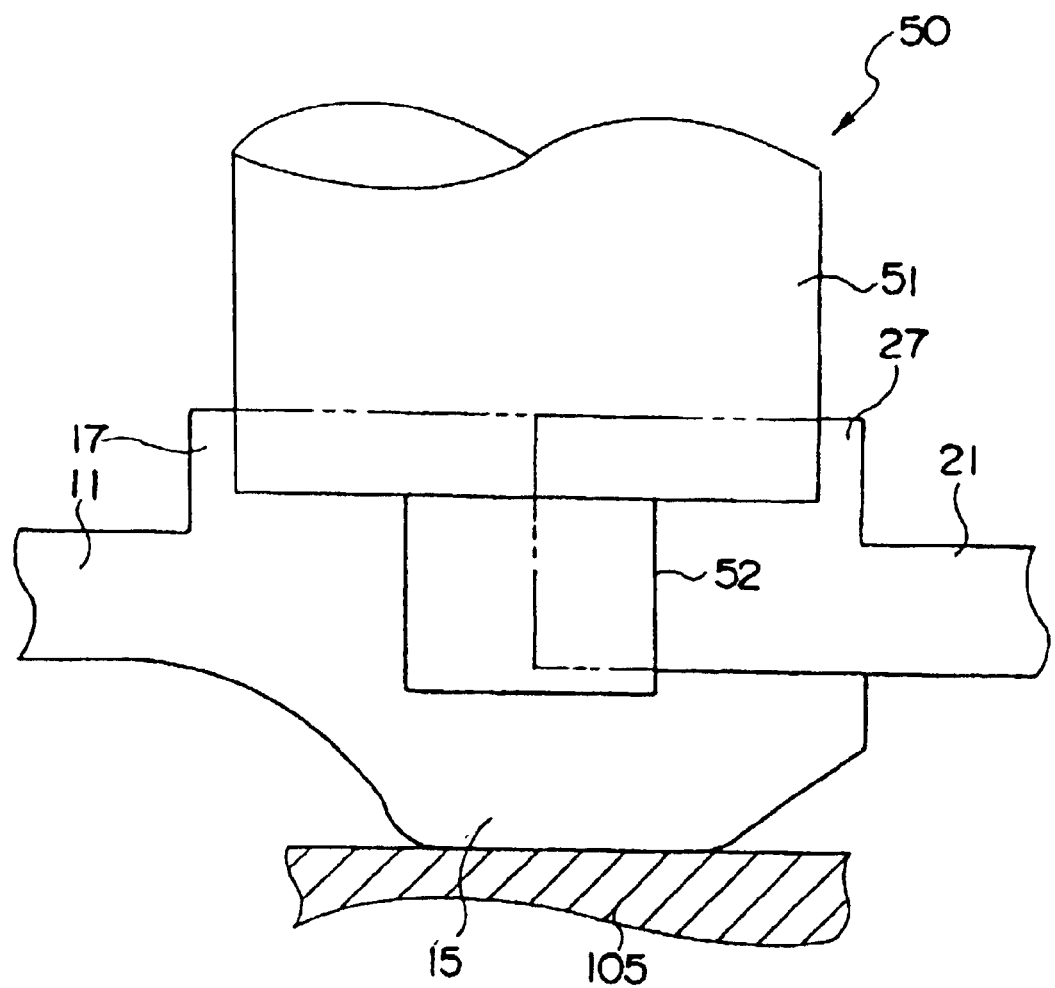
FIG. 5 is a vertical cross-sectional view showing the joint portion according to another embodiment of the present invention.

FIG. 5 shows the present welding method applied to the welding of non-hollow members. The face plates 12, 22 and connecting plates 14, 24 are eliminated from the hollow members 10 and 20 of FIG. 2. The back surface of the joint portion is mounted on a flat base 105.

The technical scope of the present invention is not limited to the terms used in the claims or in the summary of the present invention, but is extended to the range in which a person skilled in the art could easily find equivalents based on the present disclosure.

According to the friction stir welding method of the present invention, a lightweight weld having good characteristics can be obtained.

We claim:

1. A friction stir welding method for welding a first member and a second member, the first member comprising a plate, the plate being provided with a protrusion protruding substantially parallel to said plate from an end portion of said plate and arranged at a displaced position from one surface of said plate, said friction stir welding method comprising the steps of:
    superimposing an end portion of said second member on said protrusion, and abutting said end portion of said second member against the end portion of said plate, thereby providing abutted portions; and
    friction stir welding the abutted portions using a rotary tool having a small-diameter portion mounted on an end of a large-diameter portion, by inserting said small-diameter portion into a joint between said abutted portions; wherein:
    the rotary tool is positioned so that when observed along a direction in which said tool moves along said joint during the friction stir welding, a distance from a tip portion of said inserted small-diameter portion to a surface of said first member opposite from said large-diameter portion is greater on the right side of the axial center of said rotary tool than on the left side thereof, said distance from the tip portion of said inserted small-diameter portion to the surface of the first member opposite said large-diameter portion on the right side being sufficiently large to avoid flow-out of material of said first member at the right side;
    said protrusion extends to said right side of the welding line as seen in the direction of movement of said tool when performing said friction stir welding; and
    said rotary tool is rotated in a clockwise direction as observed from the large-diameter portion side while being moved along said joint during the friction stir welding.

2. A friction stir welding method according to claim 1, wherein the tip portion of small-diameter portion is inserted into said protrusion when performing said friction stir welding.

3. A friction stir welding method according to claim 1, wherein said small-diameter portion of the rotary tool has a screw thread, the screw thread being a left-hand screw thread.

4. A friction stir welding method for welding a hollow member and a second member, the hollow member comprising two substantially parallel face plates, a connecting plate for connecting said two face plates, a protrusion protruding substantially parallel to one face plate from said connecting plate, and provided at an end portion of said one face plate, and a recessed portion recessed both from the outer side of said one face plate and from the protruded direction of said protrusion at the joint portion joining said one face plate, said connecting plate and said protrusion; said friction stir welding method comprising the steps of:
    superimposing the end portion of the second member on said recessed portion, while abutting said end portion of said second member against the end portion of said one face plate, providing abutted portions having a joint therebetween; and
    friction stir welding the abutted portions using a rotary tool having a small-diameter portion mounted on an end of a large-diameter portion, by inserting said small-diameter portion into the joint between said abutted portions and said protrusion; wherein:
    said protrusion is positioned on a right side of the axial center of said rotary tool as seen when said rotary tool is observed from a direction in which said tool moves along said joint during the friction stir welding;
    a distance from a tip portion of said inserted small-diameter portion to a surface of said hollow member opposite from said large-diameter portion is greater on the right side of the axial center of said rotary tool having said protrusion than on the left side thereof, when observed from the direction in which said tool moves during the friction stir welding, said distance from the tip portion of said inserted small-diameter portion to the surface of the first member opposite said large-diameter portion on the right side being sufficiently large to avoid flow-out of material of said first member at the right side; and
    said rotary tool is rotated in a clockwise direction as observed from the large-diameter portion side while being moved along said joint during the friction stir welding.

5. A friction stir welding method according to claim 4, wherein said small-diameter portion of the rotary tool has a screw thread, the screw thread being a left-hand screw thread.

6. A friction stir welding method for welding a first member and a second member, the first member comprising a plate, the plate being provided with a protrusion protruding substantially parallel to said plate from an end portion of said plate and arranged at a displaced position from one surface of said plate, said friction stir welding method comprising the steps of:
    superimposing an end portion of said second member on said protrusion, while abutting said end portion of said second member against the end portion of said plate, thereby providing abutted portions having a joint therebetween; and
    friction stir welding the abutted portions using a rotary tool having a small-diameter portion mounted on an end of a large-diameter portion, by inserting said small-diameter portion into the joint between said abutted portions; wherein:
    the rotary tool is positioned so that when observed along the direction in which said tool moves along said abutted portions during the friction stir welding, a distance from a tip portion of said inserted small-diameter portion to the surface of said first member opposite from said large-diameter portion is greater on the left side of the axial center of said rotary tool than on the right side thereof, said distance from the tip portion of said inserted small-diameter portion to the surface of the first member opposite said large-diameter portion on the left side being sufficiently large to avoid flow-out of material of said first member at the left side;

said protrusion extends to said left side as seen in the direction of movement of said tool when performing said friction stir welding; and said rotary tool is rotated In a counter-clockwise direction as observed from the large-diameter portion side while being moved along said abutted portions during the friction stir welding.

7. A friction stir welding method according to claim 6, wherein said small-diameter portion of the rotary tool has a screw thread, the screw thread being a right-hand screw thread.

8. A friction stir welding method according to claim 6, wherein the tip portion of said small-diameter portion is inserted into said protrusion when performing said friction stir welding.

9. A friction stir welding method for welding a hollow member to a second member, the hollow member comprising two substantially parallel face plates, a connecting plate for connecting said two face plates, a protrusion protruding substantially parallel to one face plate from said connecting plate, and a recessed portion recessed both from an outer side of said one face plate and from the protruded direction of said protrusion at a joint portion joining said one face plate, said connecting plate and said protrusion; said friction stir welding method comprising the steps of:

superimposing an end portion of the second member on said recessed portion, while abutting said end portion of said second member against an end portion of said one face plate, thereby providing abutted portions and a joint therebetween; and friction stir welding the abutted portions using a rotary tool having a small-diameter portion mounted on an end of a large-diameter portion, by inserting said small-diameter portion in the joint between said abutted portions and said protrusion; wherein:

said protrusion is positioned on the left side of the axial center of said rotary tool as seen when said rotary tool is observed from the direction in which said tool moves along said joint during the friction stir welding;

a distance from a tip portion of said inserted small-diameter-portion to a surface of said hollow member opposite from said large-diameter portion is greater on the left side of the axial center of said rotary tool having said protrusion than on the right side thereof, when observed from the direction in which said tool moves during the friction stir welding, said distance from the tip portion of said inserted small-diameter portion to the surface of the first member opposite said large diameter portion on the left side being sufficiently large to avoid flow-out of material of said first member at the left side; and said rotary tool is rotated in a counter-clockwise direction as observed from the large-diameter portion side while being moved along said joint during the friction stir welding.

10. A friction stir welding method according to claim 9, wherein said small-diameter portion of the rotary tool has a screw thread, the screw thread being a right-hand screw thread.

11. A friction stir welding method for welding a first member and a second member, the first member comprising a plate, the plate being provided with a protrusion protruding substantially parallel to said plate from an end portion of said plate and arranged at a displaced position from one surface of said plate, said friction stir welding method comprising the steps of:

superimposing an end portion of said second member on said protrusion, and abutting said end portion of said second member against the end portion of said plate, thereby providing abutted portions; and friction stir welding the abutted portions using a rotary tool having a small-diameter portion mounted on an end of a large-diameter portion, by inserting said small-diameter portion into a joint between said abutted portions; wherein during the friction stir welding said rotary tool rotates in a rotational direction and moves along a direction along said joint, whereby pressure of metal mobilized during the friction stir welding is larger on one side of said rotary tool, in said direction that the rotary tool moves along said joint, than on the other side thereof;

and a distance from a tip portion of the small-diameter portion of the rotary tool, as inserted into the joint during the friction stir welding, to a surface of the first member, opposite the large-diameter portion, at the one side of the rotary tool having the larger pressure, is greater than a distance from the tip portion of the small-diameter portion of the rotary tool to a surface of the first member, opposite the larger-diameter portion, at the other side of the rotary tool, said distance from the tip portion of the small-diameter portion of the rotary tool, as inserted into the joint during the friction stir welding, to the surface of the first member, opposite the large-diameter portion, at the one side of the rotary tool having the larger pressure is sufficiently large to avoid flow-out of material of said first member at said one side of the rotary tool having the larger pressure.

12. A friction stir welding method according to claim 11, wherein said protrusion is positioned at the side of the welding line, as seen in the direction of movement at said tool when performing said friction stir welding, having the larger pressure.

* * * * *